United States Patent
Chan et al.

(10) Patent No.: US 7,394,471 B2
(45) Date of Patent: Jul. 1, 2008

(54) DYNAMIC CROSS FADING METHOD AND APPARATUS

(75) Inventors: Victor Ga-Kui Chan, Richmond (CA); Raymond Chow, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 710 days.

(21) Appl. No.: 10/818,408

(22) Filed: Apr. 5, 2004

(65) Prior Publication Data

US 2005/0219418 A1    Oct. 6, 2005

(51) Int. Cl.
   *G09G 5/00*   (2006.01)
   *G06T 13/00*  (2006.01)
(52) U.S. Cl. .................. 345/619; 345/646; 345/473; 345/629
(58) Field of Classification Search .................. 345/629, 345/545, 547, 619, 646, 473–475; 348/571, 348/595
See application file for complete search history.

(56) References Cited

U.S. PATENT DOCUMENTS

| | | | |
|---|---|---|---|
| 4,970,663 A | 11/1990 | Bedell et al. | |
| 5,287,093 A | 2/1994 | Amano et al. | |
| 5,473,737 A | 12/1995 | Harper | |
| 5,528,310 A | 6/1996 | Peters et al. | |
| 5,812,216 A | 9/1998 | Peters et al. | |
| 6,122,014 A | 9/2000 | Panusopone et al. | |
| 6,351,291 B1 * | 2/2002 | Asano | 348/564 |
| 6,532,043 B1 | 3/2003 | Kurtze et al. | |
| 6,677,956 B2 * | 1/2004 | Raskar et al. | 345/581 |
| 2004/0036778 A1 * | 2/2004 | Vernier | 348/222.1 |
| 2004/0039934 A1 * | 2/2004 | Land et al. | 713/200 |

FOREIGN PATENT DOCUMENTS

| | | |
|---|---|---|
| JP | 3-43787 | 2/1991 |
| JP | 4-186288 | 7/1992 |
| JP | 4-211295 | 8/1992 |
| JP | 5-204351 | 8/1993 |
| JP | 7303210 | 11/1995 |

* cited by examiner

*Primary Examiner*—Chante Harrison
(74) *Attorney, Agent, or Firm*—Mark P. Watson

(57) ABSTRACT

Provided is a method and apparatus for dynamic cross fading. Specifically, an embedded system can display an image produced from a blend of other images. Initially, a first image and a second image are stored in a buffer in a display controller. Then, the display controller extracts pixels from corresponding locations in the first image and the second image. The pixels are combined with weights associated with each image to perform the cross fade calculation. Consequently, the result from the cross fade calculation is transmitted to a display unit connected to the display controller for viewing. The result can also be fetched during a refresh of a panel in the display unit. In either case, the result is transmitted to a display pipe during dynamic cross fading. Thus, any images stored in the buffer remain unchanged.

23 Claims, 6 Drawing Sheets

DYNAMIC CROSS FADING METHOD AND APPARATUS

BACKGROUND

1. Field of the Invention

The present invention relates to image processing, and more specifically to cross fading in image processing.

2. Description of the Related Art

Image processing of digital images can include producing effects in video and still images. For example, one effect called cross fading permits smooth blending and transitions between images. Typically, calculations for cross fading can consume many processing cycles. For example, a desktop computer performing cross fading calculations generally does not burden resources of the desktop computer, such as memory and power. However, in a mobile device, cross fading calculations can consume too much memory and too many processing cycles. Further, the mobile device has limited battery power. Thus, when performing processor-intensive cross fading calculations on the mobile device, battery life suffers.

Another deleterious effect caused by performing cross fading calculations on the mobile device is increased bus traffic between the processor and an image processing processor. When the image processing processor performs cross fading calculations, the increased bi-directional bus traffic to and from the processor can compete with other data on the bus, thereby causing the mobile device to perform inefficiently. To overcome these limitations when performing cross fading calculations on the mobile device, solutions can include increasing memory and increasing bus lines.

However, because of limited real estate on the mobile device, it is difficult and expensive to design the mobile device to have ever-increasing memory and bus lines. For example, the memory of the mobile device can store two images for cross fading, such as an image of a dog and an image of a cat. During the transition between the two images, a third image, such as a combined image of the dog and cat is typically stored in memory. However, with references to devices with limited memory capacity, one of the original two images may be overwritten by the third image. Overwriting the original image causes the image to be irretrievably lost.

Accordingly, what is needed is a method and apparatus for performing cross fading calculations in the mobile device, while maintaining the existing resources and operating efficiency of the mobile device.

SUMMARY

Broadly speaking, the present invention is a method and apparatus for cross fading in embedded systems. An exemplary embedded system in a device to perform cross fade calculations can use existing resources, such as memory, without the need to add more memory. It should be appreciated that the present invention can be implemented in numerous ways, such as a process, an apparatus, a system, or a device, of which several inventive embodiments of the present invention are described below.

An embodiment of a method of nondestructive crossfading in an embedded system includes obtaining first image data and second image data for storage in a buffer and calculating a crossfade pixel based on corresponding pixels in the first image data and the second image data, such that the first image data and the second image data remain unchanged in the buffer. The method can also include transmitting the crossfade pixel to a display unit without overwriting the first image data and the second image data.

In another embodiment, a display controller for nondestructive crossfading includes a display buffer coupled to the processor interface, such that the display buffer is configured to store the first image data and the second image data. Further, the display controller includes a cross fader circuit coupled to the display buffer, such that the cross fader circuit is configured to receive a first pixel value associated with the first image data and a corresponding second pixel value associated with the second image data for calculating a crossfade pixel value. The first image data and the second image data remain unchanged in the display buffer. Moreover, a display unit interface is coupled to the cross fader circuit, such that the display unit interface is configured to receive the crossfade pixel value.

In an embodiment for a device for nondestructive crossfading in an embedded system, the device can include a processor coupled to a display controller, such that the display controller is configured to maintain an image stored in a buffer after nondestructive crossfading. The device also includes a display unit coupled to the display controller, such that the display controller is configured to access a cross fader circuit to display a transition image on the display unit while the image in the buffer remains unchanged.

Other aspects of the invention will become apparent from the following detailed description, taken in conjunction with the accompanying drawings, illustrating by way of example the principles of the invention.

BRIEF DESCRIPTION OF THE DRAWINGS

Exemplary embodiments of the invention may be understood by reference to the following description, taken in conjunction with the accompanying drawings in which.

DETAILED DESCRIPTION

Figure 1:
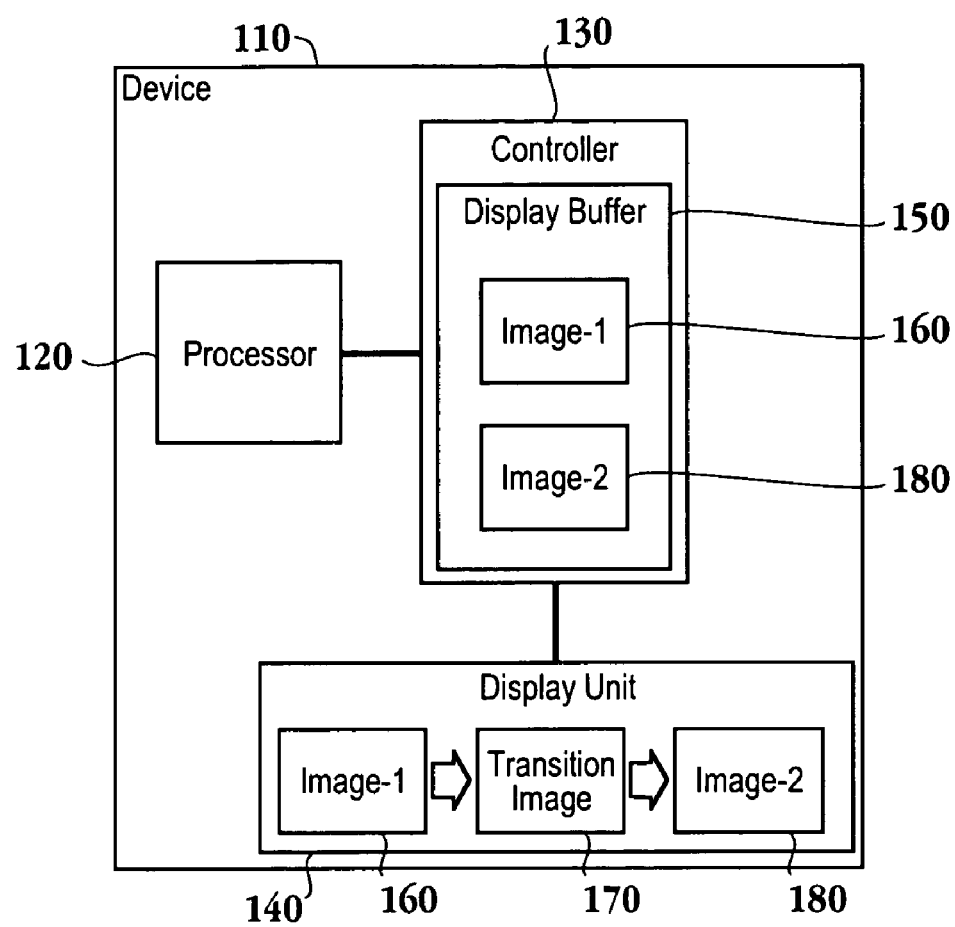
FIG. 1 is a diagram illustrating a device for cross fading images, in accordance with an embodiment of the invention.

The following embodiments describe a method and apparatus for cross fading images on a device with an embedded system. In an exemplary embodiment, the apparatus can be a mobile device, such as a cell phone or personal digital assistant (PDA). Further, a combination device that performs the functions of the cell phone and the PDA in conjunction with another device, such as a device that plays music, is possible. However, the embodiments described herein may be used with any device for performing cross fade calculations. It will be obvious, however, to one skilled in the art, that the present invention may be practiced without some or all of these specific details. In other instances, well known process opera- FIG. 1 is a diagram illustrating a device 110 for cross fading images, in accordance with an embodiment of the invention. An embedded system configured to perform a specific function, such as graphics processing, in the device 110 includes a processor 120 coupled to a display controller 130. Further, the display controller 130 is coupled to a display unit 140, such that images processed by the display controller 130 are displayed on the display unit 140. Within the display controller 130 is a display buffer 150 having any size that is capable of storing multiple images. In one embodiment, the size of the display buffer 150 can be about 100K to 512K. However, larger or smaller sizes are possible, as long as the display buffer 150 can store images. For example, an image-1 160 and an image-2 180 can be a first image data and a second image data stored in the display buffer 150. Each image, such as the image-1 160 and the image-2 180 can be an array of pixels. In one embodiment, the array of pixels can be about 320×240 or about 132×176, which may define a frame. However, any array size is possible, as long as the array of pixels can be displayed on the display unit 140.

In one exemplary embodiment, the display controller 130 transforms the image-1 160 into the image-2 180 by producing a transition image 170. The transition image 170 is a blend of the image-1 160 and the image-2 180. Further, multiple transition images 170 can exist during cross fading to produce an animated sequence. To produce the transition image 170, the display controller 130 can apply one or more weights to the images during cross fading. The weights are values that permit the display controller 130 to determine which image has a stronger appearance in the transition image 170. For example, a strong weight for the image-1 160 and a weak weight for the image-2 180 produces the transition image 170 such that the image-1 160 appears more defined than the image-2 180.

During cross fading, the display controller 130 produces the transition image 170 by extracting pixel values from corresponding locations in the image-1 160 and the image-2 180. For example, the first image data can produce a first pixel and the second image data can produce a second pixel. The first pixel and the second pixel may be referred to as corresponding pixels because the first and second pixels are from respective positions within the corresponding image data.

Consequently, the display controller 130 blends the corresponding pixel values with weights to produce a transition pixel (not shown). The display controller 130 continues to extract each pixel by corresponding location until every pixel in the array of pixels has been extracted and processed. Ultimately, the display controller 130 regroups the transition pixels to produce the transition image 170.

During the production of the transition image 170, the display controller 130 transmits the transition image 170 to the display unit 140. Thus, during a refresh of the display unit 140, which is a time when data is transmitted to the display unit 140, the display controller 130 can display the transition image 170 without interrupting the operation of the device 110. Further, by transmitting the transition image 170 to the display unit 140, original image data previously stored in the display buffer 150 need not be overwritten.

Figure 2A:
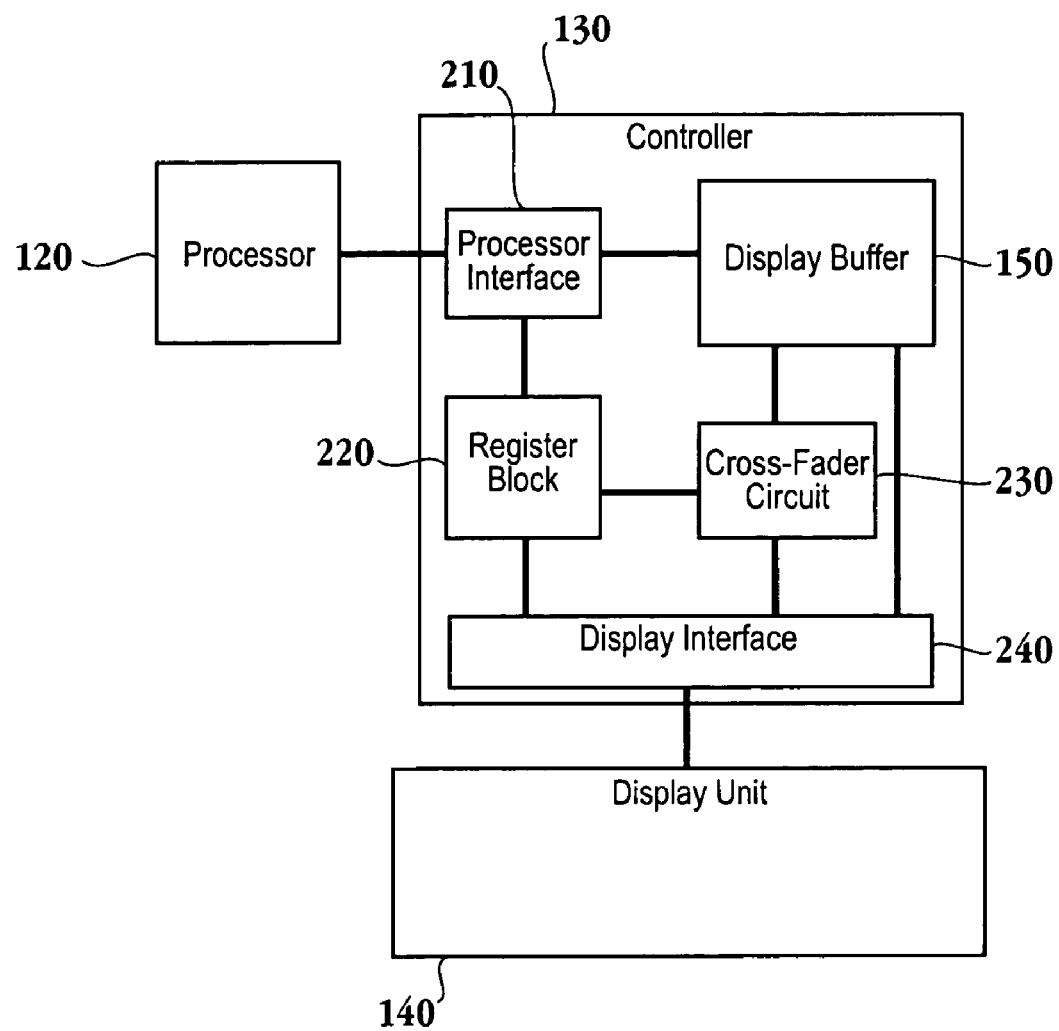
FIG. 2A is a diagram illustrating a device capable of performing cross fade calculations, in accordance with an embodiment of the invention.

FIG. 2A is a diagram illustrating the device 110, which is capable of performing cross fade calculations, in accordance with an embodiment of the invention. For example, the device 110 can include the processor 120 coupled to the display controller 130. Moreover, the display controller 130 can include a processor interface 210, the display buffer 150, a register block 220, a cross fader circuit 230, and a display interface 240. When communicating with the display controller 130, the processor 120 uses the processor interface 210 to transfer data, such as image data. Thus, image data arriving from the processor 120 bypasses the processor interface 210 for storage in the display buffer 150. Further, the register block 220 also communicates with the processor interface 210 and the display interface 240.

Within the display controller 130, the display controller 150 and the register block 220 communicate with the cross fader circuit 230. Further, the cross fader circuit 230 performs cross fade calculations and stores data in the display buffer 150 and the register block 220. Exemplary data stored in registers in the register block 220 and involved in the cross fade calculation can include a weight, a frame counter, a status, a frame for animation, a cross fade speed, and a start trigger.

Specifically, the weight is a number or value associated with the image data to determine the strength of the image data displayed on the display unit 140. The frame counter is a number defining the amount of frames used in the cross fade calculation. For example, as later described in relation to FIG. 3, when animating images during the cross fade calculation, the frame counter permits the smooth transition from the first image data to the second image data by keeping track of how many frames would have occurred before switching to the next weight.

The status is a flag capable of being represented by a bit that determines whether the cross fade circuit 230 is idle or busy. The frame for animation is a number defining the amount of frames for animating image data. The cross frame speed is a number in seconds based in the frame rate of image data displayed on the display unit 140. The start trigger is a bit value that enables or disables the cross fade calculation by the cross fader circuit 240. It is known to those of ordinary skill in the art that the data previously described are exemplary and other data are possible, as long as the cross fader circuit 240 is capable of performing cross fade calculations.

After triggering the cross fade calculation, the cross fader circuit 230 manipulates the image data from the display buffer 150. Specifically, the cross fader circuit 230 can extract pixels from corresponding locations in the image data. Then, the cross fader circuit 230 uses the weight associated with each image data to produce a crossfade pixel. For example, the first image data can have a weight-A of 99 and the second image data can have a weight of 1. Correspondingly, the cross fader circuit 230 produces the crossfade pixel that contains about 99% of the image data from the first image and about 1% of the image data from the second image.

The crossfade pixel is a product of the red (R), green (G), and blue (B) components of each pixel used in the cross fade calculation. In one embodiment, the color depth with RGB components can be eight bits. Accordingly, each pixel can be represented as an RGB/888 pixel defining 8 bits per color component. However, any color depth with any suitable number of bits is possible that is capable of representing any color component, as long as the cross fader circuit 240 can use the color depth to produce the crossfade pixel. The crossfade pixel is a result of the cross fade calculation. Thus, each crossfade pixel can be grouped in an array of pixels to form the transition image 170 (FIG. 1). Then, the transition image 170 is transmitted to the display unit 240 instead of the display buffer 150 to avoid overwriting existing image data or adding to the display buffer 150.

In one exemplary embodiment, the formula for determining the crossfade pixel can be:

$$Pixel_{crossfade} = (Weight_{Image-1} * Pixel_{Image-1} + Weight_{Image-2} * Pixel_{Image-2}) \text{ DIV } (Weight_{Image-1} + Weight_{Image-2})$$

such that $Weight_{Image-1} + Weight_{Image-2}$ is a weight constant.

Dividing by the sum of the first weight and the second weight produces a weighted average. When $(Weight_{Image-1} + Weight_{Image-2}) = 1$, the crossfade pixels is the sum of the product of the pixel values and the associated weights. The weight constant determines the highest number of possible crossfade transitions. Thus, for example, the highest number of possible crossfade transitions for the RGB/888 pixel is 256 ($2^8$). However, in other embodiments, other formulas for performing the cross fade calculation are possible, as long as the results from the calculations do not overwrite existing image data.

An exemplary embodiment of the display unit 240 is a thin film transistor (TFT) panel, which uses one to four transistors to control each pixel displayed on the panel. TFT panels continuously perform a display refresh to redraw an image. Thus, during the display refresh, the display controller 130 can provide image data for viewing on the TFT panel via a display pipe from the display controller 130. Exemplary refresh rates can be about 30 hertz (Hz), 60 Hz, or 70 Hz. However, any refresh rate is possible, as long as the panel is capable of fetching image data on the refresh.

In one embodiment, the cross fader circuit 230 processes image data stored in the display buffer 150. However, in other embodiments, the cross fader circuit 230 processes image data transmitted from the processor 120. The image data can be transmitted from any source, as long as the display controller 130 performs the cross fade calculation and transmits image data to the display pipe without overwriting or adding image data to the source.

In another embodiment of a panel that does not require a refresh, such as a random access memory (RAM) integrated display panel, the display unit 140 can temporarily accumulate the crossfade pixels for viewing when the display refresh is initiated. In other embodiments, where the display unit 140 operates at a clock as fast or faster than the display controller 130, the display unit need not accumulate the crossfade pixels. Thus, as each crossfade pixel enters the display pipe between the display controller 130 and the display unit 140, the crossfade pixel can be immediately displayed for viewing.

The cross fading method and apparatus previously described is dynamic because pixels in the original image data are extracted for the cross fade calculations. Further, the resulting crossfade pixels are transmitted to the display unit 140 without overwriting the original image data or being stored in the display buffer 150. Subsequently, during dynamic cross fading, the resulting crossfade pixels are generated when the display panel refreshes. Correspondingly, the cross fader circuit 230 decreases bus traffic to the processor 120 and within the controller 130, thereby improving the operating efficiency of the device 110.

Figure 2B:
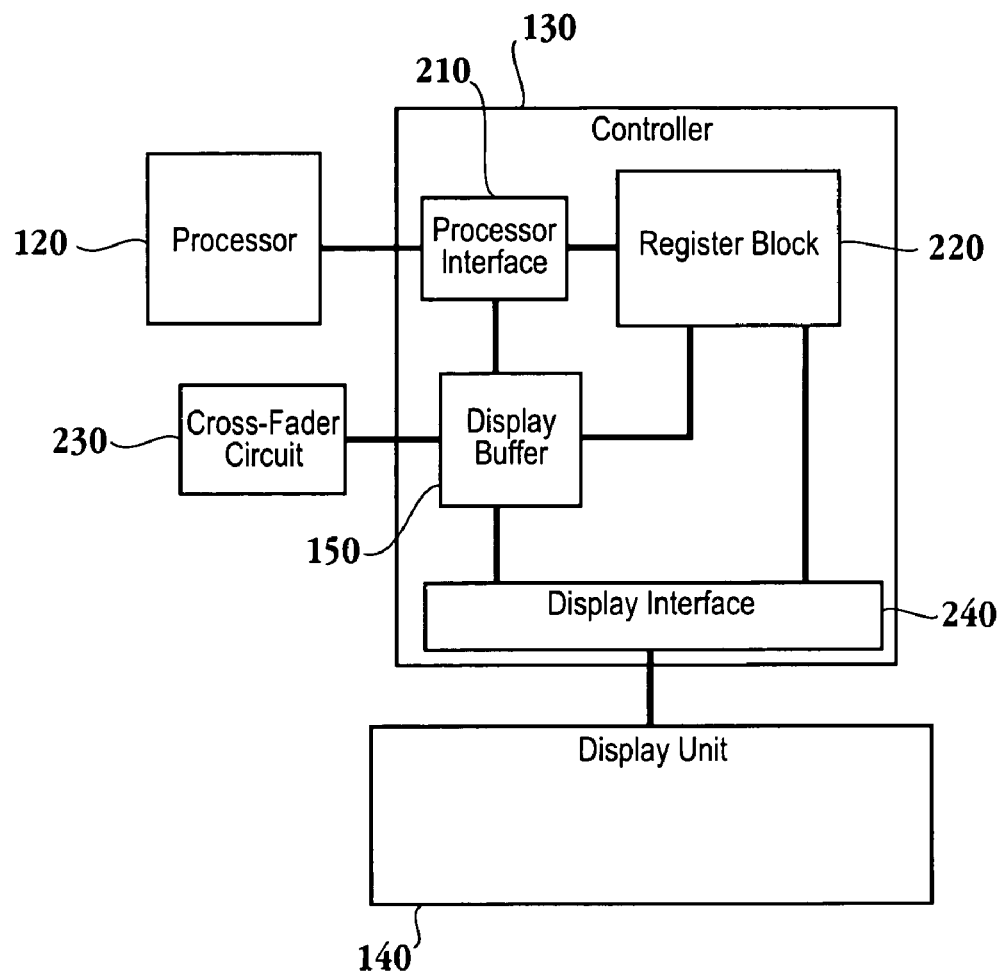
FIG. 2B is another diagram illustrating another device capable of performing cross fade calculations, in accordance with another embodiment of the invention.

In one embodiment, the cross fader circuit 230 is contained within the display controller 130. However, in other embodiments, the cross fader circuit 230 can be external to the display controller 130, i.e. "off chip." FIG. 2B is another diagram illustrating another device capable of performing cross fade calculations, in accordance with another embodiment of the invention. Specifically, the cross fader circuit 230 is coupled to the display buffer. Thus, in one exemplary embodiment, when the cross fader circuit 230 performs cross fade calculations using image data stored in the display buffer 150, the cross fader circuit 230 can process the image data and produce the transition image 170 for display. However, instead of overwriting or storing image data in the display buffer 150, the transition image bypasses the display buffer 150, leaving the image data previously stored in the display buffer 150 unchanged. In other embodiments, the cross fader circuit 230 can be in any location, as long as the cross fader circuit 230 is capable of performing cross fade calculations that produce a result that does not overwrite or add image data in the display buffer 150.

Figure 3:
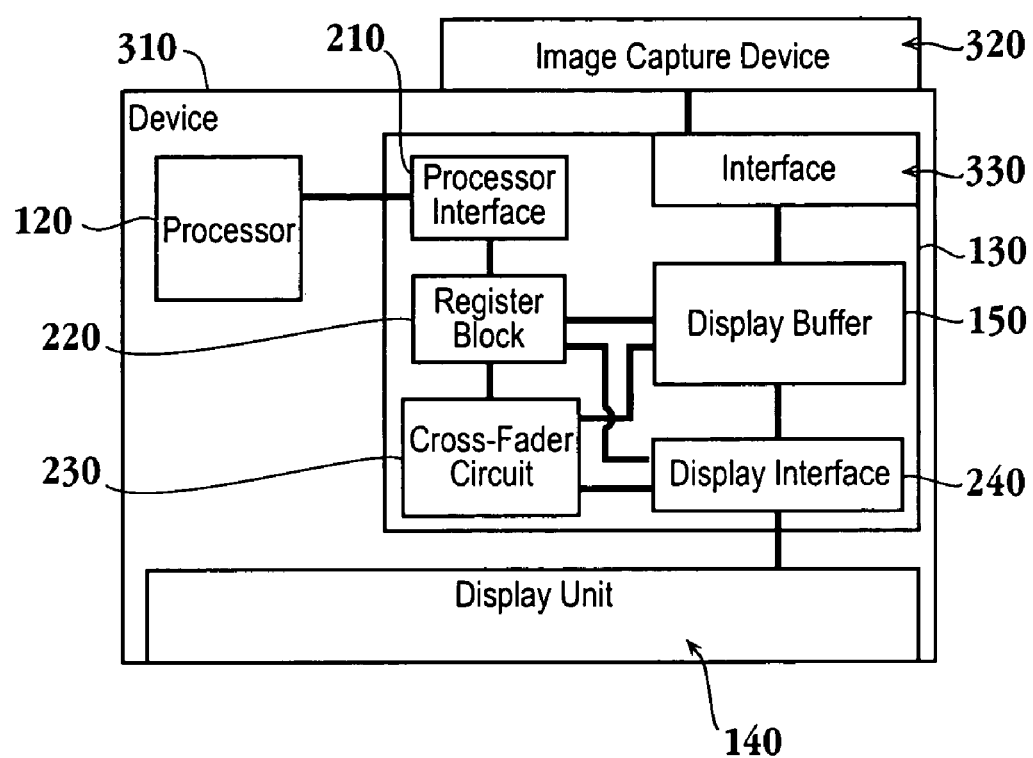
FIG. 3 is a diagram illustrating yet another device capable of performing cross fade calculations, in accordance with yet another embodiment of the invention.

FIG. 3 is a diagram illustrating yet another device capable of performing cross fade calculations, in accordance with yet another embodiment of the invention. Specifically, an alternative embodiment of the device 110 is a device 310 that is connected to an image capture device 320. The image capture device 320 is capable of capturing still image data or moving image data and transmitting the image data to an interface 330 in the display controller 130. For example, the image capture device 320 can be connected to a port (not shown) or can be an integrated unit in the device 310. The image data can be stored in the display buffer 150 and can be accessed by the processor 120 via the processor interface 210 and the register block 220. Further, the image data can be accessed for cross fade calculations by the cross fader circuit 230. Then, the result from the cross fade calculations and the original image data stored in the display buffer 150 can be transmitted to the display interface 240.

When animating image data, the source images can be two moving images or the source images can be one moving image and a still image. Thus, to perform the cross fade calculation, the display controller 310 mixes the images in real time and transmits the result to the display unit 140. In one exemplary embodiment for animation, a first frame and a second frame can have multiple frames during the transition. For example, to produce 16 transition images 170 (FIG. 1), the cross fade calculation involves 16 frames with a starting weight of 0 and an ending weight of 100. Both weights are associated with the second frame. After setting the cross frame speed, the animation sequence can begin. The first frame has a weight of 0. The first frame remains on the display unit 140 until the next frame appears. Subsequently, the following frames will have increasing weights to 100, thereby slowly causing the first image data in the first frame to blend with the second image data in the second frame in an animated sequence. Alternative embodiments can also animate the two frames by fading in to black and fading out from black. However, any method of animating multiple images is possible, as long as the display controller 310 can perform the cross fade calculation on the fly by transmitting the result of the cross fade calculation to the display pipe.

Although FIGS. 1-3 illustrate different configurations, any connections are possible in other exemplary embodiments, as long as image data can be accessed for cross fade calculations. Further, the device 310 can have any configuration, as long as the data from the processor can be processed by the display controller 130 and displayed on the display unit 140. For example, the processor 120, the display controller 130, and the display unit 140 can be connected with a system bus (not shown). Further, any of the components within the display controller 130 can connect to the display unit 140, as long as image data processed by the controller is displayed on the display controller 140.

Figure 4:
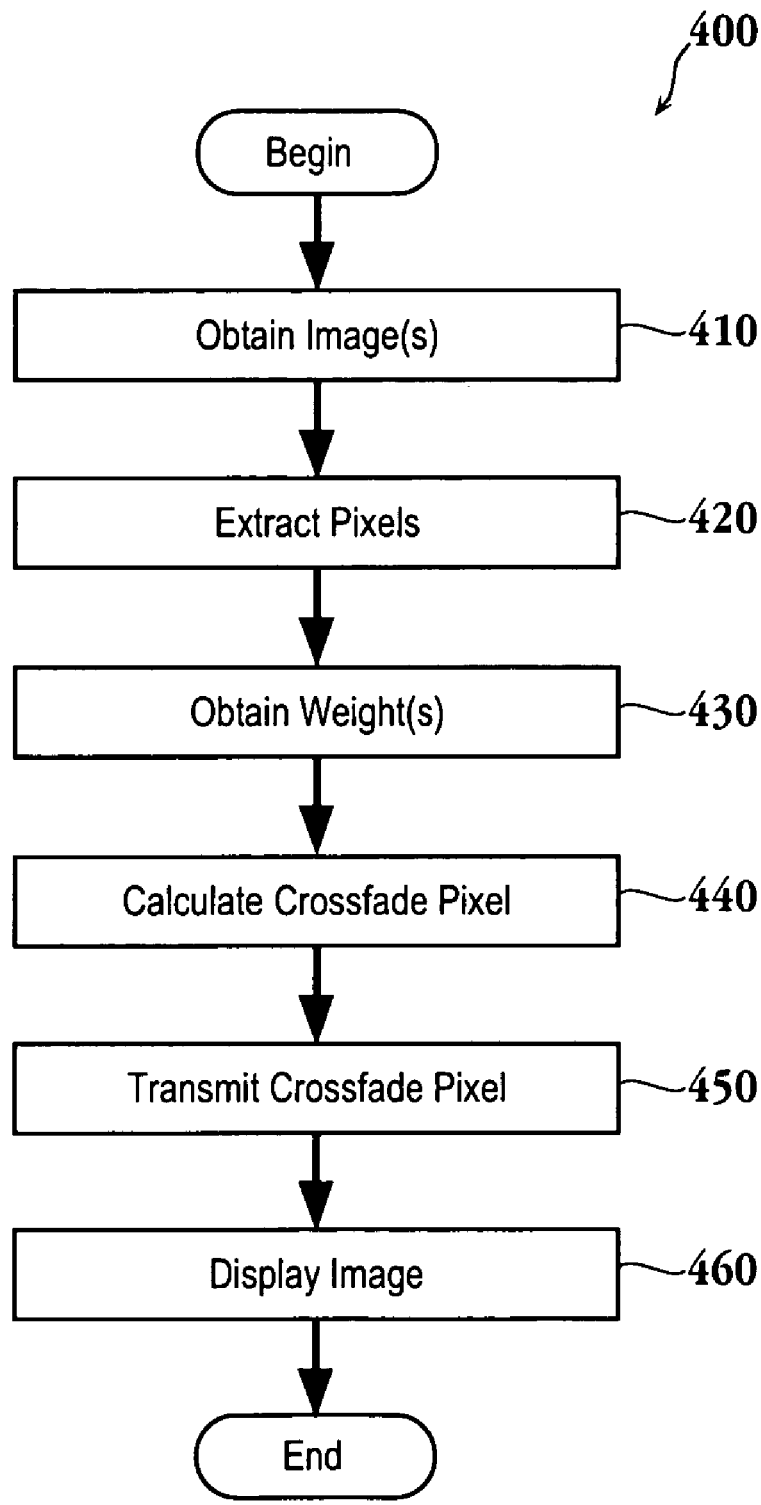
FIG. 4 is a flowchart diagram of a method for cross fading, in accordance with an embodiment of the invention.

FIG. 4 is a flowchart diagram of a method 400 for cross fading, in accordance with an embodiment of the invention. The method 400 can begin when the device 110 obtains images in operation 410. For example, in one embodiment, the processor 120 can provide an image. In other embodiments, the display buffer 150 can provide the image. However, the device 110 can obtain images from any source, as long as the images can be processed in cross fade calculations. Then, in operation 420, the cross fader circuit 230 can extract pixels from the image data. Specifically, pixels are extracted from corresponding locations in the arrays of pixels. In operation 430, the cross fader circuit 230 obtains weights associated with each image data. The cross fader circuit 230 then calculates the crossfade pixel using the weights and pixels extracted from the image data in operation 440 as described in FIGS. 1-3.

Consequently, in operation 450, the display controller 130 transmits the crossfade pixel to the display unit 140. Thereafter, in operation 460, the display unit 460 displays the grouped crossfade pixels as the transition image 170. In one embodiment, the crossfade pixels are grouped by the display interface 240 and during a refresh of the display unit 140, the display interface 240 transmits the transition image 170 to the display unit 140. However, in other embodiments, depending on the type of panel used in the display unit 140, the panel may not require a refresh. Accordingly, the display unit 140 need not receive the transition image 170 during the refresh. After performing the dynamic cross fade, the method 400 ends.

Figure 5:
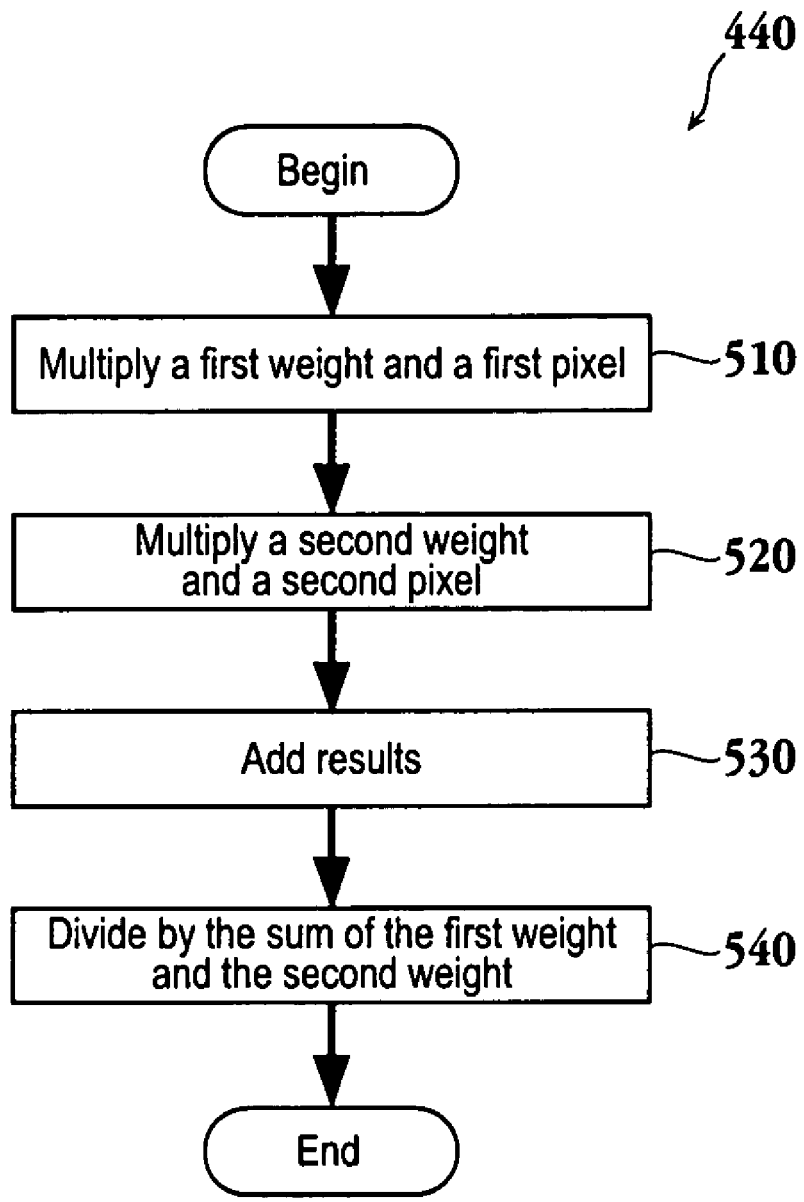
FIG. 5 is a flowchart diagram of a method for performing cross fade calculations, in accordance with an embodiment of the invention.

FIG. 5 is a flowchart diagram of a method for performing cross fade calculations, in accordance with an embodiment of the invention. Exemplary operations for performing cross fade calculations by the cross fader circuit 240, as indicated in operation 440, can begin in operation 510. Specifically, the cross fader circuit 240 multiples a first weight and a first pixel. Then, in operation 520, the cross fader circuit 240 multiples a second weight and a second pixel. In operation 530, the cross fader circuit 240 adds the results from the multiplication operations and then in operation 540, divides the result by the sum of the first weight and the second weight. Thus, the weights determine which of the first pixel and the second pixel have a stronger appearance. Consequently, the operations end.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method of nondestructive crossfading in an embedded system of a mobile battery powered device, comprising:
   obtaining first image data and second image data for storage in a buffer;
   calculating a crossfade pixel based on corresponding pixels in the first image data and the second image data, the calculating including multiplying a first weight with a pixel from the first image data being greater than one, wherein the first image data and the second image data remain unchanged in the buffer; and
   transmitting the crossfade pixel to a display unit without overwriting the first image data and the second image data, the transmitting including bypassing storage of the crossfade pixel in the buffer.

2. A method of nondestructive crossfading in an embedded system of claim 1, wherein obtaining the first image data and the second image data further includes receiving an array of pixels.

3. A method of nondestructive crossfading in an embedded system of claim 2, wherein the array of pixels include a plurality of RGB pixels.

4. A method of nondestructive crossfading in an embedded system of claim 1, wherein the crossfade pixel is produced from a cross fade calculation.

5. A method of nondestructive crossfading in an embedded system of claim 4, wherein the cross fade calculation includes multiplying a second weight with a corresponding pixel from the second image data, the second weight being greater than one, the second weight independent from the first weight.

6. A method of nondestructive crossfading in an embedded system of claim 5, wherein multiplying a first weight with a pixel from the first image data and multiplying a second weight with a corresponding pixel from the second image data further includes dividing a sum of results from multiplying the second weight and multiplying the first weight by a weight constant representing a number of cross fade transitions.

7. A method of nondestructive crossfading in an embedded system of claim 6, further including changing the first weight and the second weight after a number of frames.

8. A method of nondestructive crossfading in an embedded system of claim 7, further including decreasing the first weight and increasing the second weight.

9. A method of nondestructive crossfading in an embedded system of claim 8, wherein animation further includes producing multiple transition images to transition from the first image data to the second image data.

10. A method of nondestructive crossfading in an embedded system of claim 1, wherein displaying the crossfade pixel further includes grouping the crossfade pixel with other crossfade pixels.

11. A method of nondestructive crossfading in an embedded system of claim 1, wherein transmitting the crossfade pixel to the display unit without overwriting the first image data and the second image data further includes refreshing an image on the display unit.

12. A display controller for nondestructive crossfading, comprising:
   a display buffer coupled to a processor interface, the display buffer configured to store first image data and second image data, the second image representing a different image than the first image data;

a cross fader circuit coupled to the display buffer, the cross fader circuit configured to receive a first pixel value associated with the first image data and a corresponding second pixel value associated with the second image data for calculating a crossfade pixel value, wherein the first image data and the second image data remain unchanged in the display buffer, the cross fader circuit multiplying the first pixel value by a first weight and the second pixel value by a second weight, wherein the first weight and the second weight are both greater than one; and a display unit interface coupled to the cross fader circuit, the display unit interface configured to receive the crossfade pixel value, wherein the display unit interface transmit the crossfade pixel to a display pipe without adding the crossfade pixel to the display buffer.

13. A display controller for nondestructive crossfading of claim 12, wherein the first pixel and the second pixel are extracted from corresponding locations in an array of pixels.

14. A display controller for nondestructive crossfading of claim 12, wherein the cross fader circuit calculates a sum from a result of the multiplying and the sum is divided by a weight constant representing a number of cross fade transitions to yield the cross fade pixel value.

15. A display controller for nondestructive crossfading of claim 14, wherein the first weight and the second weight define a percentage of overlap of the first pixel and the second pixel in the crossfade pixel.

16. A display controller for nondestructive crossfading of claim 12, wherein the display unit further includes multiple crossfade pixels for animation.

17. A device for nondestructive crossfading in an embedded system having limited memory and power resources, comprising:

a processor coupled to a display controller, wherein the display controller is configured to maintain separate images stored in a buffer after nondestructive crossfading, the display controller having a cross fader circuit and registers, the cross fader circuit configured to calculate a crossfade pixel value from the images stored in the buffer, the cross fader circuit accessing weights stored in corresponding registers for multiplying corresponding pixels of respective separate images to define a transition image, wherein the weights are values greater than one; and a display unit coupled to the display controller, wherein the display controller is configured to access the cross fader circuit to display a transition image on the display unit while the images in the buffer remain unchanged.

18. A device for nondestructive crossfading in an embedded system of claim 17, wherein each of the images is a frame of an array of pixels.

19. A device for nondestructive crossfading in an embedded system of claim 18, wherein the images are obtained from an image capture device.

20. A device for nondestructive crossfading in an embedded system of claim 18, wherein the cross fader circuit is further configured to calculate a sum from a result of the multiplying and divide the sum by a weight constant representing a number of cross fade transitions to yield the cross fade pixel value.

21. A device for nondestructive crossfading in an embedded system of claim 20, wherein the crossfade pixel is transmitted to a display pipe and bypassing storage in the buffer of the display controller.

22. A device for nondestructive crossfading in an embedded system of claim 17, wherein one of the registers includes a frame counter value representing a number of frames to display prior to changing values for the weights.

23. A device for nondestructive crossfading in an embedded system of claim 22, wherein when values for the weights change one of the weights increments and one of the weights decrements.

* * * * *